United States Patent [19]

Nowell

[11] 4,323,958
[45] Apr. 6, 1982

[54] CIRCUIT FOR CONTROLLING THE SWITCHING FREQUENCY OF SCR REGULATORS

[75] Inventor: John R. Nowell, Phoenix, Ariz.

[73] Assignee: Honeywell Information Systems Inc., Phoenix, Ariz.

[21] Appl. No.: 191,112

[22] Filed: Sep. 26, 1980

[51] Int. Cl.³ .............................................. H02P 13/22
[52] U.S. Cl. ........................................ 363/28; 323/283
[58] Field of Search ...................... 363/17, 27, 28, 41, 363/42; 323/282, 283, 211

[56] References Cited

U.S. PATENT DOCUMENTS

| | | | |
|---|---|---|---|
| 3,697,853 | 10/1972 | Nowell et al. | 363/28 |
| 4,045,887 | 10/1977 | Nowell. | |
| 4,095,165 | 6/1978 | Boros | 323/283 |
| 4,109,194 | 8/1978 | Miller | 323/283 |

*Primary Examiner*—William H. Beha, Jr.
*Attorney, Agent, or Firm*—William W. Holloway, Jr.; L. J. Marhoefer; N. Prasinos

[57] ABSTRACT

A control apparatus for a switching regulator circuit having a voltage controlled oscillator responsive to any deviation of the output voltage of the switching regulator circuit from a predetermined reference voltage. The voltage controlled oscillator produces a digital pulse stream having a frequency which is varied by the voltage controlled oscillator in response to any deviation of the output voltage of the switching regulator circuit from the predetermined reference voltage. A recovery detector is connected to at least one of the reactors of the switching regulator circuit to ensure that the particular SCR associated with that reactor has fully recovered prior to the next actuation thereof. If the particular SCR has not recovered then the digital pulse which would be distributed to that SCR within the digital pulse stream is held. The digital pulse stream is received from the recovery detector by a maximum frequency detector, which prevents the digital pulse stream from exceeding a predetermined maximum frequency. The output of the maximum frequency detector is received by the SCR sequencer which distributes the individual pulses within the digital pulse stream in a known sequence to the switching regulator circuit for actuation of the individual SCRs therein.

12 Claims, 5 Drawing Figures

CIRCUIT FOR CONTROLLING THE SWITCHING FREQUENCY OF SCR REGULATORS

BACKGROUND OF THE INVENTION

1. Field of the Invention

This invention relates to a control circuit for a direct current power supply, and, more particularly, this invention relates to a control circuit for a paired semiconductor controlled rectifier-inductive reactor, switching regulator circuit.

2. Description of the Prior Art

Control circuits for switching regulator devices are known in the prior art. For example, reference is made to U.S. Pat. No. 4,045,887 issued to John Nowell on Sept. 6, 1977 and entitled "Switching Regulator Control Circuit". The control circuit shown in Nowell provides monitoring of the output of the switching regulator circuit to provide the necessary gating signals to each SCR (the semiconductor control rectifiers will be mostly referred to as SCRs hereinafter) to maintain the proper output voltage. The control circuit as shown in Nowell allows the frequency at which the SCRs are actuated to be varied slightly by slightly alterning the frequency of the clock.

None of the prior constructions show a control apparatus for a switching regulator circuit which is capable of varying the rate at which the SCRs are actuated by utilizing a voltage control oscillator capable of producing a digital pulse stream having a frequency stable within the range of 0 to 400 KHZ.

SUMMARY OF THE INVENTION

The present invention comprises a control apparatus for a switching regulator circuit. The control apparatus includes an operational amplifier which provides signals indicative of the deviation of the output of the switching regulator circuit from a certain predetermined voltage. The output of the operational amplifier is utilized to control a pulse width modulator which produces a digital pulse stream which has a frequency within the range of 0-400 KHZ in response to the output received from the operational amplifier. The operational amplifier and the pulse width modulator comprise a voltage controlled oscillator (VCO). The control apparatus also includes a recovery detector which is connected to at least one SCR within the switching regulator circuit for preventing the actuation of the SCR prior to full recovery of the reactor. The recovery detector receives the digital pulse stream from the pulse width modulator and prevents the pulse which would be utilized to gate the SCR from occurring prior to that full recovery.

A maximum frequency detector, which is also within the control apparatus, receives the digital pulse stream from the pulse width modulator through the recovery detector and prevents the digital pulse stream from exceeding a certain predetermined frequency. The digital pulse stream from the maximum frequency detector is received by an SCR sequencer, which is capable of providing one pulse of the digital pulse stream to each SCR within the switching regulator circuit in a known sequence. The pulse provided to the SCR acts as a gating pulse which is applied to the gate of the SCR which causes it to conduct through its anode and cathode. After a particular SCR is actuated by the pulse from the SCR sequencer, each of the other SCRs within the switching regulator circuit are provided in the known sequence with pulses prior to the next pulse being provided to that particular SCR by the SCR sequencer.

The switching regulator circuit has each of its SCRs connected to the primary winding of a rector. The secondary windings of the reactors are connected to the output of the switching regulator circuit through diodes. As the load increases the greater current flow tends to cause the output voltage of the switching regulator to drop. The voltage controlled oscillator within the control apparatus increases the frequency of the digital pulse stream, thereby providing more energy to the output. Therefore, more current is supplied to the output of the switching regulator circuit. The increased output current maintains the output voltage of the switching regulator circuit at its predetermined regulated value. If the load decreases, the frequency of the digital pulse stream is decreased and, therefore, the output current decreases.

The operational amplifier compares the output voltage from the switching regulator circuit to a certain preselected reference voltage. If the output voltage tends to decrease, the voltage controlled oscillator increases the frequency of the digital pulse stream. If the voltage tends to increase, the voltage controlled oscillator decreases the frequency of the digital pulse stream to compensate therefore.

The operational amplifier and pulse width modulator are capable of producing a digital pulse stream having an accurate stable frequency within the range of 0-400 KHZ. Thus, the switching regulator circuit is enabled to produce an accurate regulated voltage which is equal to its preselected output voltage within the range of 1% to 100% of the rated load.

It is an advantage of the control apparatus of the present invention to provide the necessary gating pulses to a switching regulator circuit to enable it to provide its preselected voltage as an output for loads between 1% and 100% of the rated output.

It is a further advantage of the control apparatus to provide a digital pulse stream having an accurate frequency within the range of 0 to 400 KHZ.

It is a further advantage of the present invention to control the digital pulse stream by preventing said digital pulse stream from exceeding a certain maximum frequency which is predetermined.

DESCRIPTION OF THE PREFERRED EMBODIMENT

Figure 1:
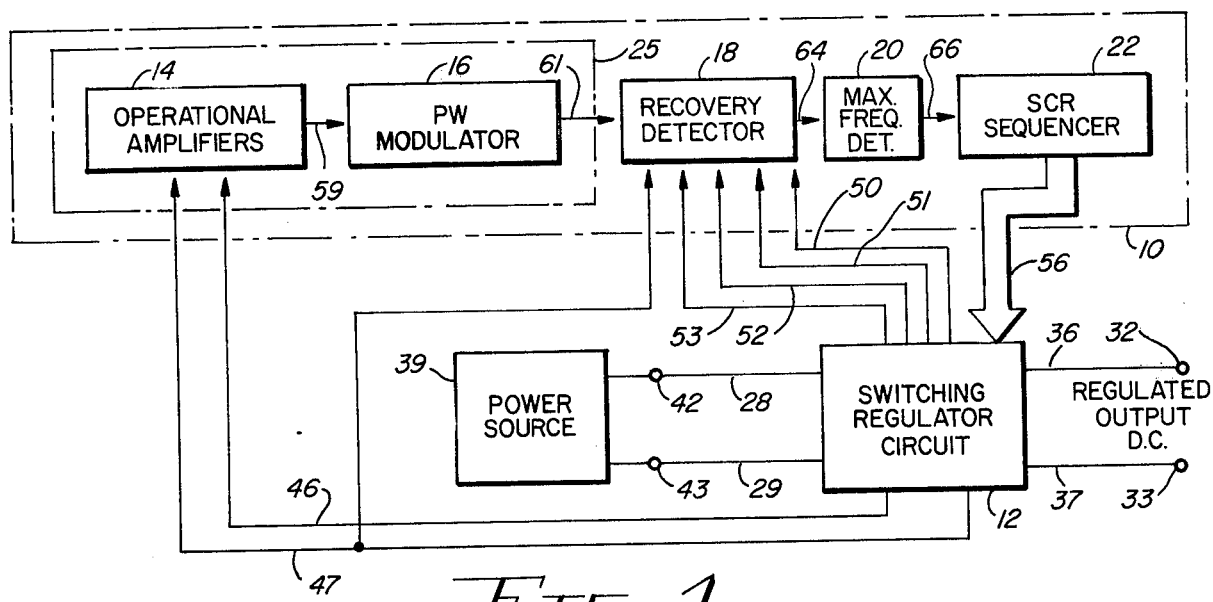
FIG. 1 is a block diagram of the switching regulator circuit and the control apparatus of the present invention.

With reference to the drawings and in particular to FIG. 1 thereof, a control apparatus 10 is connected to a switching regulator circuit 12. The control apparatus 10 includes an operational amplifier 14, a pulse width modulator 16, a recovery detector 18, a maximum frequency detector 20, and an SCR sequencer 22. Operational amplifier 14 and pulse width modulator 16 comprise a voltage controlled oscillator 25. Switching regulator circuit 12 receives an unregulated DC input through lines 28 and 29 of some appropriate voltage, for example, 286 volts DC. Although the various regulated output voltages can vary according to particular requirements of the circuits to which power is being provided by the switching regulator circuit 12, in the particular example as disclosed herein the output is 3.3 volts DC provided to output terminals 32 and 33 through lines 36 and 37, respectively. The input to lines 28 and 29 is from an unregulated power source 39 through input terminals 42 and 43, respectively.

The operational amplifier 14 is connected to the output voltage present on lines 36 and 37 and, therefore, to the output terminals 32 and 33 through lines 46 and 47, respectively. The switching regulator circuit 12 is also connected through lines 50 through 53 to recovery detector 18. Recovery detector 18 is also connected to switching regulator circuit 12 through line 47. SCR sequencer 22 provides gating pulses to each of the SCRs (to be discussed in detail hereinafter in connection with FIG. 5) within switching regulator circuit 12 through multiline channel 56.

Within control apparatus 10 the ouptut of the operational amplifier 14 is connected through line 59 to pulse width modulator 16. The output of pulse width modulator 16, which comprises the digital pulse stream, is connected to recovery detector 18 through line 61. The output of recovery detector 18 is connected through line 64 as an input to the maximum frequency detector 20. The input to SCR sequencer 22 is connected through line 66 to the output of maximum frequency detector 20. The locations of the recovery detector 18 and maximum frequency detector 20 can be reversed if desired so that maximum frequency detector 20 receives the output of pulse width modulator 16 and recovery detector 18 receives as its input the output of maximum frequency detector 20. Recovery detector 18 can have its output connected as the input to SCR sequencer 22, if maximum frequency detector and recovery detector were reversed. The lines 46 and 47 which sense the output voltage of switching regulator circuit 12 can be connected to the output terminals 32 and 33 as shown in U.S. patent application Ser. No. 80,642 by Genuit filed on Nov. 1, 1979 and entitled "Switching Regulator Circuit With Phase Shift Subtraction", now U.S. Pat. No. 4,298,924, which is incorporated herein to by reference.

Figure 5:
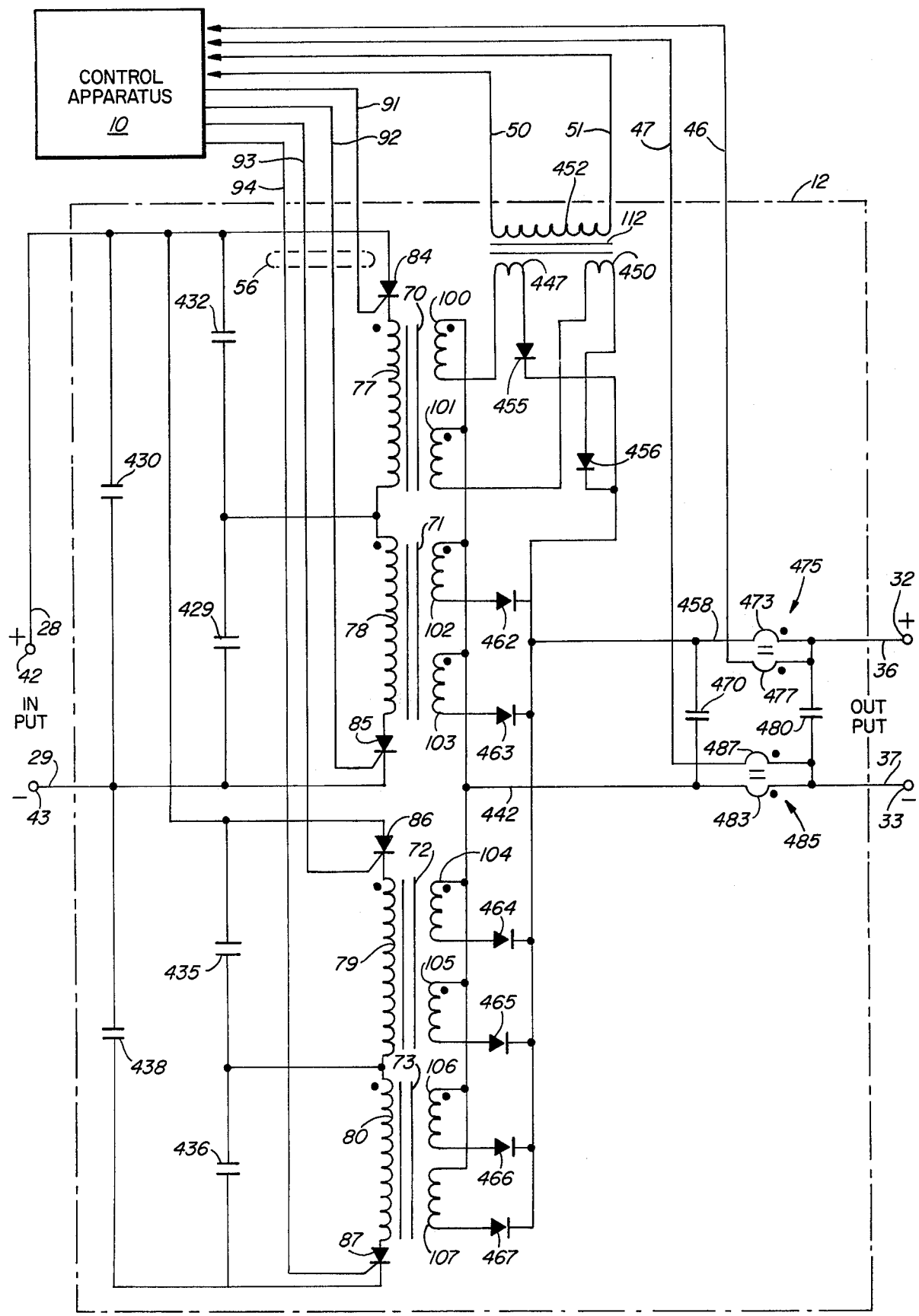
FIG. 5 is a schematic diagram of the switching regulator circuit of FIG. 1.

A portion of the full switching regulator circuit 12 is shown in FIG. 5. The switching regulator circuit 12 as shown in FIG. 5 is discussed in detail hereinafter. However, the switching regulator circuit 12 will be discussed briefly immediately herebelow to facilitate an understanding of the operation of the control apparatus 10.

The output of switching regulator circuit 12 is provided through lines 36 and 37 to output terminals 32 and 33, respectively. Although only four reactors 70 through 73 are shown in FIG. 5, 16 reactors are utilized with the control apparatus as shown herein. Eight of the reactors, although connected similarly to the reactors 70 through 73, have the diodes associated therewith and SCRs reversed for optimized usage of the power supplied from power source 39 (FIG. 1). The remaining eight reactors which include reactors 70 through 73 are connected substantially identically with reactors 70 through 73 as shown in FIG. 5. Each reactor 70 through 73 is provided with a primary winding 77 through 80, respectively. Each primary winding 77 through 80 is connected in series with an SCR 84 through 87, respectively. Each primary winding and its associated SCR is connected to the DC input voltage on terminals 42 and 43 from power source 36 (FIG. 1).

SCRs 84 through 87 are connected through lines 91 through 94, respectively, to control apparatus 10. Lines 91 through 94 comprise a portion of the lines forming channel 56. Each line 91 through 94 is connected to the gate of its respective SCR. Each reactor 70 through 73 is provided with two secondary windings, 100-101, 102-103, 104-105, and 106-107, respectively. Each secondary winding is connected in series with the output of the switching regulator circuit 12 to output terminals 32 and 33. When the switching regulator circuit 12 is in operation gating pulses are provided by the control apparatus to the SCRs through multiline channel 56. The energy provided by the power source 36 (FIG. 1) is transferred through the reactors to provide the desired output. Feedback is provided through lines 46 and 47 to control apparatus 10 for maintaining the preselected output voltage which is referenced to a certain voltage within the control apparatus 10. In addition, the output of two of the primary windings, for example, 100 and 101 of reactor 70 are connected through a transformer 112 to lines 50 and 51 for determining if the reactor 70 has ceased to conduct. If, for example, reactor 70 was conducting, i.e., still transferring energy, and another gating pulse was applied to SCR 84 through line 91 from control apparatus 10, to SCR 84 could fail catastrophically. The control apparatus 10 will now be discussed in detail herebelow followed by a detailed discussion of the operation of the switching regulator circuit 12 as shown in FIG. 5.

Figure 3:
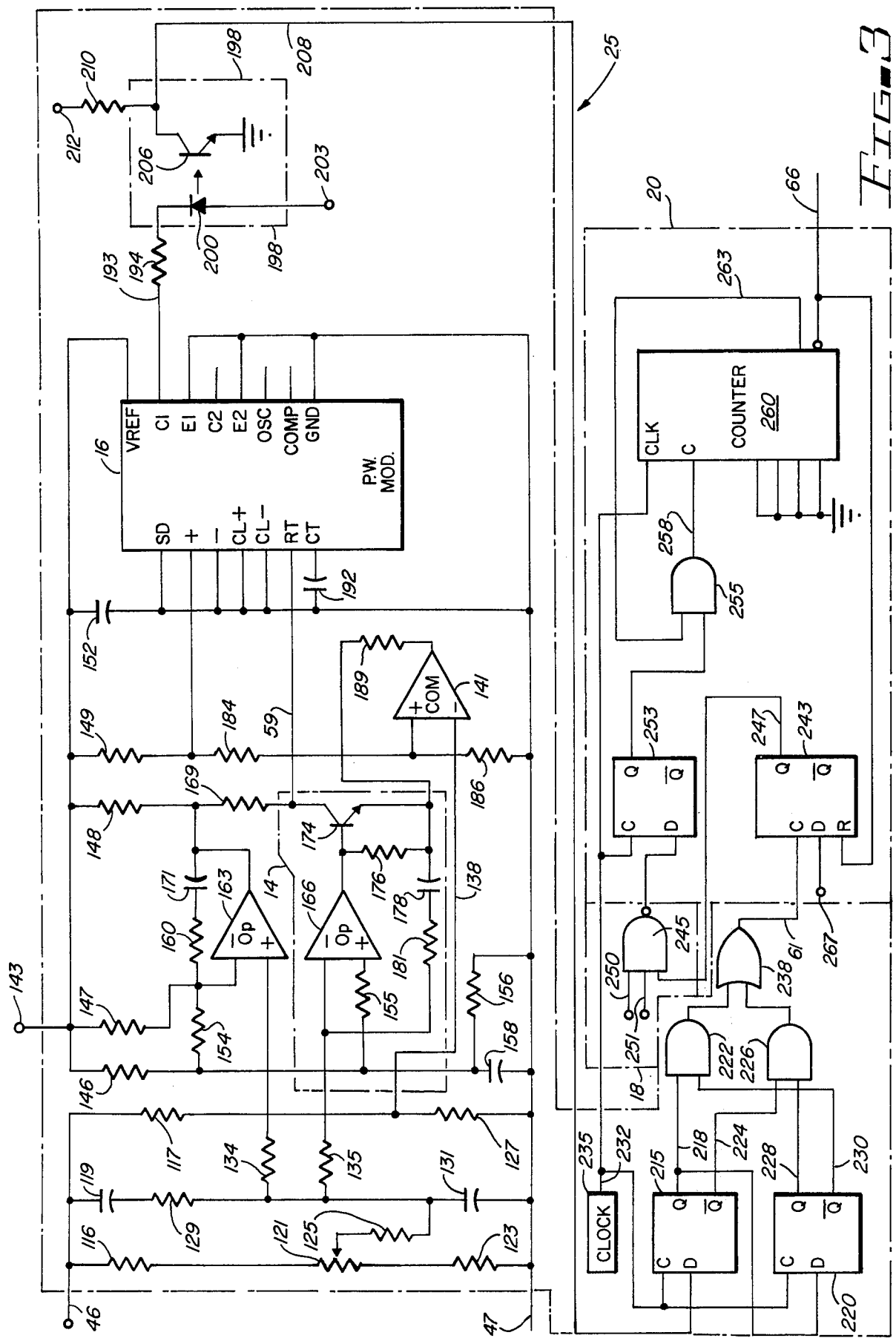
FIG. 3 is a schematic diagram of the voltage controlled oscillator and maximum frequency detector shown in FIG. 1.

The operational amplifier 14 and the pulse width modulator 16 which comprise the voltage controlled oscillator 25 are shown in detail in FIG. 3. As discussed above the output voltage of the switching regulator circuit 12 is received on lines 46 and 47 by the voltage controlled oscillator 25. Line 47 is connected to resistors 116 and 117, and capacitor 119. The other opposite end of resistor 116 is connected to a potentiometer 121. The other side of the potentiometer 121 is connected through resistor 123 to line 47. The sliding contact of potentiometer 121 is connected to one end of resistor 125. Resistor 117 is connected through another resistor 127 to line 47. The side of capacitor 119 away from line 46 is connected through a resistor 129 and a capacitor 131 to line 47. The side of resistor 125 away from potentiometer 121 is connected between capacitor 131 and resistor 129. Resistors 134 and 135 are connected at one end between resistors 129 and capacitor 131. A line 138 is connected at one end between resistors 117 and 127 and at its other opposite end to the negative input of comparator 141.

A certain reference voltage is applied to input terminal 143. Input terminal 143 is connected to resistors 146 through 149, capacitor 152 and the voltage reference pin of pulse width modulator 16. Resistor 146 is connected to one end of resistors 154, 155 and 156, and to one side of capacitor 158. The other opposite ends of resistor 156 and capacitor 158 are connected to line 47. The other opposite end of resistor 154 is connected to resistors 147 and 160 and to the negative input of operational amplifier 163. The positive input to operational amplifier 163 is connected to the end of resistor 134 away from resistor 129. The output of operational amplifier 163 is connected to resistors 148 and 169 and capacitor 171. The negative input of operational amplifier 166 is connected to the end of resistor 135 away from its connection to resistor 129. The other opposite end of resistor 155 away from resistor 146 is connected to the positive input of operational amplifier 166. The output of operational amplifer 166 is connected to the base of transistor 174 and to one end of resistor 176. The emitter of transistor 174 is connected to the other opposite end of resistor 176 and to a capacitor 178. The other side of capacitor 178 is connected through a resistor 181 to the negative input of operational amplifier 166. The collector of transistor 174 is connected to line 59 and to the end of resistor 169 away from its connection to the output of operational amplifier 163.

Resistor 149 is connected to the noninverted input of pulse width modulator 16 and to a resistor 184. The end of resistor 184 away from resistor 149 is connected to the positive input of comparator 141 and to one end of a resistor 186. The other opposite end of resistor 186 is connected to line 47. The output of comparator 141 is connected to the emitter of transistor 174 through a resistor 189.

As shown in FIG. 3, comparator 141 actuates operational amplifier 166 so that if the reference voltage is not applied to terminal 143 operational amplifier 166 will not provide a signal through line 59 to actuate the pulse width modulator. Operational amplifier 163 is connected to provide an initial signal to line 59 during the "power on" sequence.

Operational amplifier 166 is connected to be provided with a reference voltage which represents a certain biased amount of the reference voltage on line 143 as determined by resistor 146 and resistor 156. The output voltage of switching regulator circuit 12, as provided on lines 46 and 47, is biased by resistors 116 and 123, and finally biased by potentiometer 121. The voltage from the sliding contact of potentiometer 121 is applied to the negative input of operational amplifier 166 through resistors 125 and 135. The difference between the reference voltage supplied to the positive input of operational amplifier 166 and the output voltage of switching regulator circuit 12, as applied through the various resistors to the negative input of operational amplifier 166 is amplified and becomes the output from operational amplifier 166. The output of operational amplifier 166 is applied to the base of transistor 174 to provide an output to line 59 which is proportional to the amount of deviation between the preselected reference voltage applied to the positive input of operational amplifier 166 and the output voltage of switching regulator 12 (FIG. 1) which is applied to the negative input of operational amplifier 166. The proportional voltage which represents the deviation discussed above is applied to the RT input of the current mirror of pulse width modulator 16.

The end of capacitor 152 away from input terminal 143 is connected to line 47 and to the shut down input, the inverter input, the CL positive and negative inputs and through a capacitor 192 to the capacitive input of the current mirror of pulse width modulator 16. The emitter outputs and the second collector output, the oscillator output, the comparator output and ground of pulse width modulator 16 are all tied to line 47. The first collector output is connected through line 193 to a resistor 194. By utilizing the first collector output of pulse width modulator 16 the pulses received are one-half of the frequency of the output of the oscillator output. An optical coupler 198 is connected to the end of resistor 194 away from the pulse width modulator 16. The purpose of optical coupler 198 is to isolate the analog circuitry just discussed from the digital circuitry which is discussed herebelow.

The optical coupler 198 has a light emitting diode 200 which has its cathode connected to the end of resistor 194 away from pulse width modulator 16. The anode of light emitting diode 200 is connected to input terminal 203, which has a positive DC voltage applied thereto. A phototransistor 206 is positioned to receive the light emitted by light emitting diode 200. The emitter of transistor 206 is connected to ground and the collector thereof is connected to line 208 and resistor 210. The end of resistor 210 away from phototransistor 206 is connected to input terminal 212 which has a positive DC voltage applied thereto.

The pulse width modulator 16 can be of any type of pulse width modulator generally known in the art which is adaptable to the present invention; however, the pulse width modulator known as SG3524 has been found useful. Operational amplifiers 163 and 166 are generally designated as LM324. Comparator 141 is designated as LM339.

Line 61 connects the collector of phototransistor 206 to the data input of flip-flop 215. The Q output of flip-flop 215 is connected through line 218 to the data input of flip-flop 220 and AND gate 222 as an input. The /Q (which is inverted from the logic indication of the Q output) is connected through line 224 to AND gate 226 as an input. The Q output of flip-flop 220 is connected through line 228 as an input to AND gate 226. The /Q output of flip-flop 220 is connected through line 230 as an input to AND gate 222.

The clock inputs to flip-flops 215 and 220 are connected through line 232 to the output of a four MHZ clock 235. The outputs of AND gates 222 and 226 are connected as inputs to an OR gate 238. The output of OR gate 238 is connected through line 61 to the clock input of a flip-flop 243. The Q output of flip-flop 243 is connected as an input to NAND gate 245 through line 247. NAND gate 245 is a portion of recovery detector 18. Flip-flop 243 is within maximum frequency detector 20. Line 64 of FIG. 1 does not appear in FIG. 3 because of the particular arrangement of logic elements shown therein. The other inputs to NAND gate 245 are provided through lines 250 and 251. The output of NAND gate 245 is connected to the data input of a flip-flop 253. The clock input to flip-flop 253 is connected to clock 235 through line 232. The Q output of flip-flop 253 is connected as an input of AND gate 255. The output of AND gate 255 which is a component of maximum frequency detector 20 is connected through line 258 to a counter 260. Counter 260 can be the counter 74LS191 as known in the art. Line 258 connects AND gate 255 to the count enable input of counter 260. The data inputs of counter 260 are connected to ground. The maximum output of counter 260 is connected through line 263 as an input to AND gate 255. The ripple clock output of counter 260 is connected to line 66 and to the reset input of flip-flop 243.

Flip-flops 215, 220 and AND gates 222 and 226 and OR gate 238 co-operate to multiply the digital pulse stream present on line 208 by two. Thus the frequency of the digital pulse stream present on line 61 has a frequency equal to that obtainable at the oscillator output of pulse width modulator 16. The arrangement of FIG. 3 is utilized because the optical coupler 198 is frequency limiting. Flip-flops 243 and 253, AND gate 255 and counter 260 comprise the maximum frequency detector 20. The data input of flip-flop 243 has a high signal applied thereto through line 267.

Assuming the output of counter 260 has gone low and flip-flop 243 is reset, the next low to high transition of the digital pulse stream on line 240 will cause the flip-flop 243 to provide a high signal at its Q output to line 247. The output of NAND gate 245 will go low (provided that the signals on lines 250 and 251 are high which is discussed in detail hereinafter). The next low to high transition of the clock pulse on line 232 along with the low signal on the data input of flip-flop 253 causes the Q output to go low which in turn causes the output of AND gate 255 to go low even if the counter 260 is providing a high signal to line 263. When the signal to the count enable input of counter 260 from line 258 goes high the counter 260 is disabled and does not count the clock pulse on line 232.

As counter 260 counts from 0 up to a maximum count of 15 the output of counter 260 to line 263 is low and its output to line 66 is high. When counter 260 reaches a count of 15 the output of the counter to line 263 goes high. When the count present within counter 260 reaches 15 and the clock pulse on line 232 is low, the output of the counter to line 66 goes low and the flip-flop 243 is reset, i.e., the Q output of flip-flop 243 goes low. Low output to line 247 causes NAND gate 245 to go high and during the next low to high transition of clock 235, the Q output of flip-flop 253 applied to AND gate 255 goes low. This in turn causes AND gate 255 to go low which allows counter 260 to count. The output of AND gate 255 goes high only if the count of counter 260 is at 15 and the output of flip-flop 253 to its Q output is high.

The maximum frequency which is predetermined by the rate at which counter 260 counts from 0 to 15. If the digital pulse stream present on line 240 has a frequency less than the maximum frequency flip-flop 243 will be reset as discussed above with its Q output low. When the next low to high transition of the ditial pulse stream is present on line 61, the output of flip-flop 243 to its Q output goes high which causes the output and NAND gate 245 to go low (assuming that the output on lines 250 and 251 is high). The next low to high transition of clock 235, the Q output of flip-flop 253 goes low which causes the output of NAND gate 255 to go low. This removes the count inhibit signal on line 258 and allows counter 260 to begin the count again. If the frequency of the digital pulse stream on line 240 exceeds the maximum frequency determined by counter 260 counting 15 times, after counter 15 has its ripple clock output go low and resets flip-flop 243 and the output of flip-flop 243 goes low until a low to high transition on line 61 is received. When the next digital pulse is received on line 61, it causes the output of flip-flop 253 as discussed above to go low so that, when the maximum/minimum output of counter 260 to line 263 goes high, the output of NAND gate 255 does not go high and therefore the counter continues to count at the maximum frequency. The low to high transitions of the output of the ripple clock of counter 216 to line 66, if the counter is clocked by a 4 MHZ clock will provide a maximum output frequency for the digital pulse stream of 250 KHZ.

If the frequency of the digital pulse stream present on line 240 is less than 250 KHZ, the preselected maximum frequency, when the output of the maximum/minimum output on counter 260 goes high, at a count of 15, the output of AND gate 255 will go high and inhibit the ripple clock output of counter 260 going low. When the next low to high transition of the digital pulse stream on line 61 occurs the output of flip-flop 243 goes high which in turn causes the output of flip-flop 253 to go low during the next low to high transition of the clock pulse from clock 253. This causes the output of AND gate 255 to go low which allows counter 260 to begin to count again. The ripple clock output of counter 260 goes low when the clock goes low, which resets flip-flop 243 which in turn causes the output of flip-flop 253 to go high as discussed above. Thus, the digital pulse stream on line 66 which is the output of maximum frequency detector 20 cannot exceed the preselected maximum frequency. Each low to high transition to line 66 comprises one digital pulse of the digital pulse stream.

Figure 2:
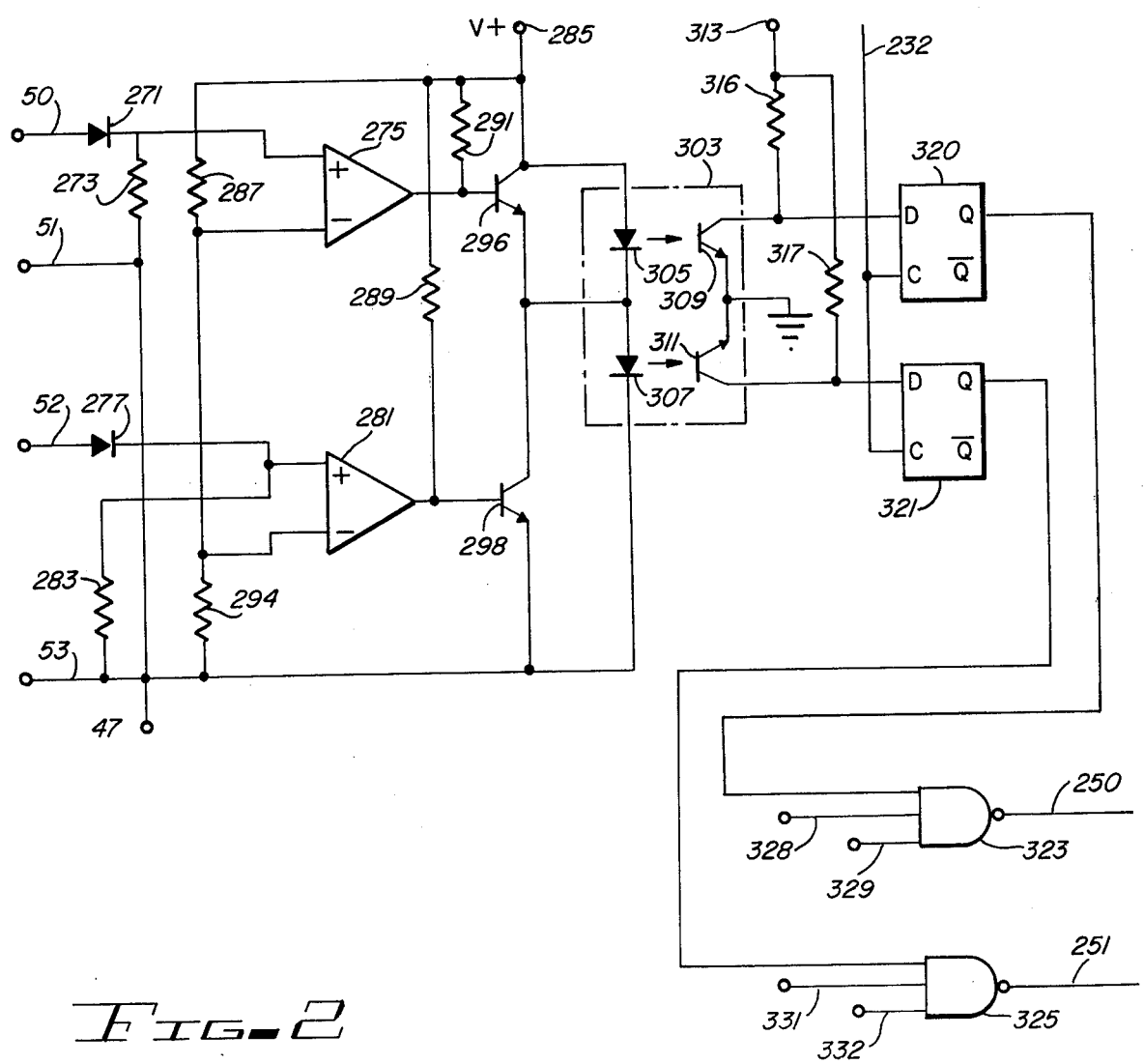
FIG. 2 is a schematic diagram of the recovery detector shown in FIG. 1.

Recovery detector 18 is shown in detail in FIG. 2. Detector 18 receives inputs as discussed above from two of the reactors on lines 50 through 53. Each reactor is associated with one SCR. Line 50 is connected to the anode of a diode 271. The cathode of diode 271 is connected to a resistor 273 and the positive input to comparator 275. The other opposite end of resistor 273 away from diode 271 is connected to lines 51, 53 and 47. Line 52 is connected to the anode of a diode 277. The cathode of diode 277 is connected to the positive input of comparator 281 and to one end of resistor 283. The opposite end of a resistor 283 is connected to lines 51, 53, and 47. A positive DC voltage is applied to input terminal 285. Terminal 285 is connected to one end of resistors 287, 289 and 291. The end of resistor 287 away from terminal 285 is connected to the negative input of comparators 275 and 281, and one end of a resistor 294. Resistor 294 has its end away from comparators 275 and 281 connected to lines 47, 51, and 53.

The end of resistor 289 away from terminal 285 is connected to the output of comparator 281, and the end of resistor 291 away from terminal 285 is connected to the output of comparator 275. The outputs of comparators 275 and 281 are also connected to the bases of transistors 296 and 298, respectively. The collector of transistor 296 is connected to terminal 285. The emitter of transistor 296 is connected to the collector of transistor 298. The emitter of transistor 298 is connected lines 47, 51, and 53. An optical coupling 303 provides isolation between the analog portions discussed above and the digital portions (to be discussed herebelow) of the circuitry shown in FIG. 2. Optical coupling 303 is comprised of light emitting diodes 305 and 307 and phototransistors 309 and 311. Diode 305 and transistor 309 are optically coupled and are optically isolated from diode 307 and transistor 311. Diode 307 is optically coupled to transistor 311. The collector of transistor 296 is connected to the anode of diode 305. The cathode of diode 305 is connected to the anode of diode 307, the emitter of transistor 296, and the collector of transistor 298. The cathode of diode 307 is connected to lines 47, 51, and 53. The emitters of transistors 309 and 311 are connected to ground.

A terminal 313 has a positive DC voltage applied thereto. Terminal 313 is connected to resistors 316 and 317. The end of resistor 316 away from terminal 313 is connected to the collector of transitor 309, and the end of resistor 317 away from terminal 313 is connected to the collector of transistor 311. The collectors of transistors 309 and 311 are also connected to the data inputs of flip-flops 320 and 321, respectively. The 4 MHZ clock 235 (FIG. 3) is connected through line 232 to the clock inputs of flip-flops 320 and 321. The Q output of flip-flop 320 is connected to a NAND gate 323. The Q output of flip-flop 321 is connected as an input of NAND gate 325. The outputs of NAND gates 323 and 325 are connected through lines 250 and 251, respectively, as inputs to NAND gate 245 (FIG. 3). NAND gate 323 also receives inputs through lines 328 and 329 and NAND gate 325 receives inputs through lines 331 and 332.

If diodes 455 and 456 (FIG. 5) are conducting (and reactor 70 transferring energy from primary winding 77 to secondary windings 100-101) transformer 112 has a potential developed between lines 50 and 51. This potential is transferred as an input to the inputs of comparator 275. If the potential at the positive input is over that as determined by the potential present at the negative input of comparator 275, which is biased from the actual DC value on teminal 285 by resistors 287 and 294, the comparator turns on and causes transistor 296 to conduct. Light emitting diode 305 is turned off and the signal applied to the data input of flip-flop 320 goes high. In other words, since transistor 309 is no longer receiving light from diode 305 it does not conduct and the positive voltage from terminal 313 as applied to the input of flip-flop 320. During the next low to high transition of the clock pulse on line 232 the Q output of flip-flop 320 goes high or remains high if it was previously high. The high input to NAND gate 323 along with high inputs from on lines 328 and 329, if present, causes NAND gate 323 to go low. The low output of NAND gate 323 applied to NAND gate 245 (FIG. 3) through line 250 causes the output of NAND gate 245 to go high. During the next clock pulse from clock 235 the output of flip-flop 253 goes high as applied to NAND gate 255. The operation of the flip-flops 243 and 253 NAND gate 255 and counter 260 co-operate as discussed above except that the output of NAND gate 245 will not go low until the signals on line 250 goes high again.

When the diodes 455 and 456 (FIG. 5) are not conducting and transformer 112 does not have a potential thereacross the output of comparator 275 is low which shuts off transistor 296. Diode 205 will therefore conduct and emit light which is received by transistor 309. Transistor 309 conducts and the data input of flip-flop 320 has a low signal applied thereto. During the next high to low transition of the clock pulse on line 232 the Q output of flip-flop 320 goes low the output of NAND gates 323 goes high and remains high. Thus, as long as reactor 70 is transferring energy and has not yet recovered from its prior pulse actuation, the Q output of flip-flop 320 is high. After the reactor 70 has ceased to conduct, the Q output of flip-flop 320 goes low.

Comparator 381, transistor 298, diode 307, transistor 311, flip-flop 321, and NAND gate 325 co-operate in the same manner as comparator 275, transistor 296, diode 305, transistor 309, flip-flop 320, and NAND gate 323.

Figure 4:
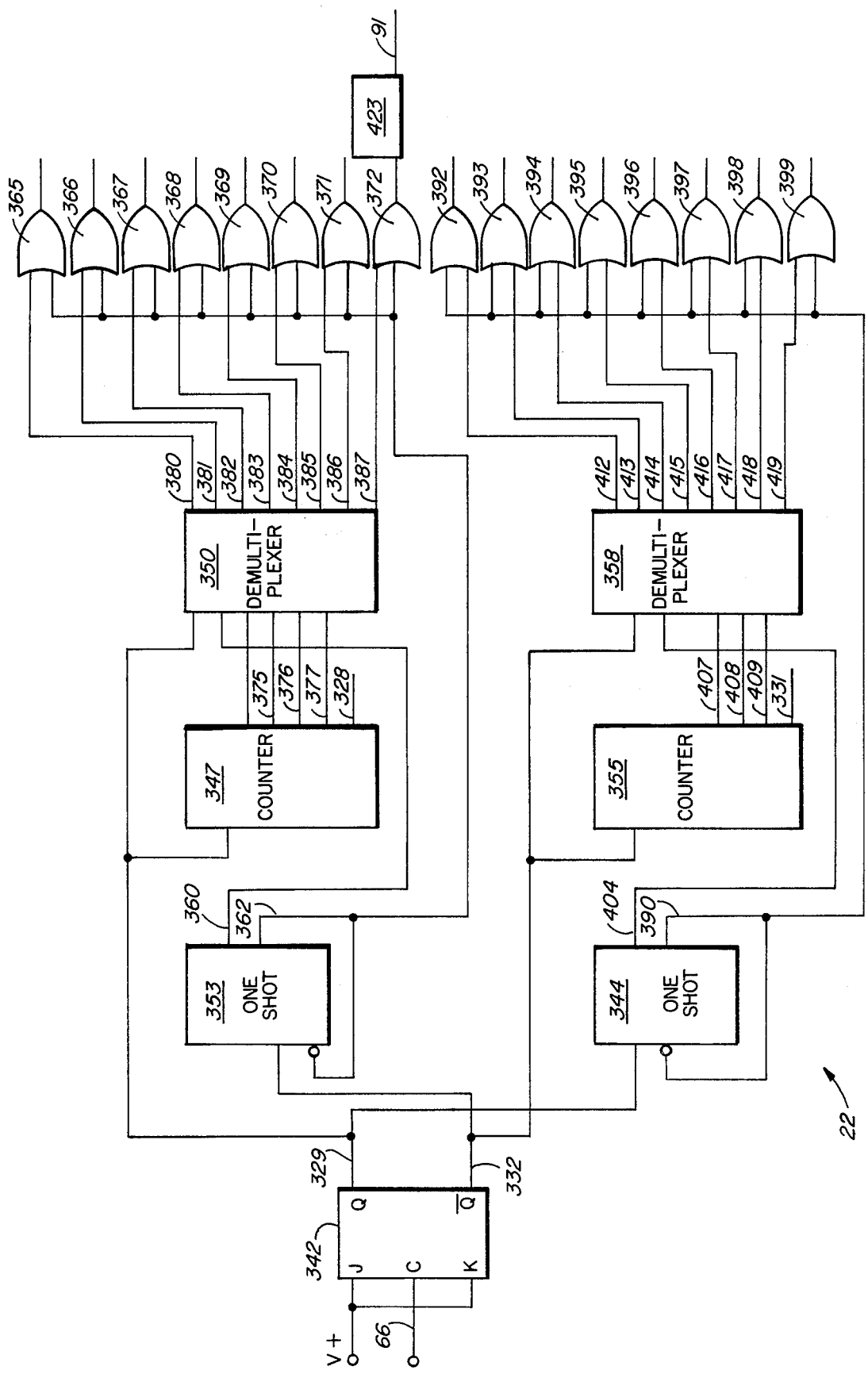
FIG. 4 is a schematic diagram of the SCR sequencer shown in FIG. 1.

The SCR sequencer 22 is shown in detail in FIG. 4. Line 66 connects the ripple clock of counter 260 (FIG. 3) to flip-flop 342. Flip-flop 342 has its Q output connected to line 239. The Q output of flip-flop 342 is connected through line 329 to a monostable multivibrator 344, a counter 347, a demultiplexer 350, and NAND gate 323 (FIG. 2). Line 329 is connected to the noninverted trigger input of multivibrator 344. Specifically, line 329 connects the Q output of flip-flop 342 to the count enable input of counter 347 and the decode enable input of demultiplexer 350.

The /Q output of flip-flop 342 is connected through line 322 to the noninverted trigger input of monostable multivibrator 353, the count clock input of counter 355, and the decode enable input of a demultiplexer 358. Line 332 also connects the /Q output of flip-flop 342 to an input of NAND gate 325 (FIG. 2). Monostable multivibrators 344 and 353 are connected for positive edge triggering. The maximum/minimum output of counters 347 and 355 are connected to lines 328 and 331, respectively. Lines 328 and 331 are connected as inputs to NAND gates 323 and 325, respectively (FIG. 2). The Q output of multivibrator 353 is connected through line 360 to an enable input of demultiplexer 350. The /Q output of multivibrator 353 is connected through line 362 as an input to the inverted enable input of multiplexer 353 and as an input of OR gates 365 through 372. The count outputs of counter 347 are connected through lines 375 through 377 to the data inputs of demultiplexer 350. The outputs of demultiplexer 350 are connected through lines 380 through 387 to an input of OR gates 365 through 372, respectively.

The /Q output of multivibrator 344 is connected through line 390 to the inverted input of multivibrator 344 and as an input to OR gates 392 through 399. The noninverted trigger input of multivibrator 344 is connected through line 329 to the Q output of flip-flop 342. The Q output of multivibrator 344 is connected through line 404 to enable input of demultiplexer 358. The data outputs of counter 355 are connected through lines 407, 408, and 409 to the data inputs of demultiplexer 358. The data outputs of demultiplexer 358 are connected through lines 412 through 419 as inputs to OR gates 392 through 399, respectively. The output of each of the OR gates 365 through 372 and 392 through 399 are connected to one of the SCR drivers (only SCR driver 423 is shown herein). SCR driver 423 is connected through line 91 to the gate of SCR 84. Line 91 receives the gating pulse generated by SCR driver 423 and receives it to the gate of SCR 84 (FIG. 5). During the low to high transition of the digital pulse stream present on line 66 the output of flip-flop 342 to its Q and /Q outputs toggles (because its J and K inputs are connected to a constant high signal). If the Q output is high it goes low during the low to high transition of the digital pulse stream on line 66 and the /Q output which is the inverse of the Q output goes from low to high.

Whe the Q output of flip-flop 342 goes from low to high the count of counter 347 advances by one. Demultiplexer 350 is disabled and all of its outputs to lines 380 through 387 go high.

The low to high transition on line 329 from the Q output of flip-flop 342 causes multivibrator 344 to trigger. Multivibrator 344 produces a high pulse of known duration as its output on line 404. When the Q output of flip-flop 342 to line 329 went high its output from the /Q output to line 332 goes low. The low output on line 332 and the high pulse on line 404 enables demultiplexer 358 and one of its outputs to lines 412 through 419, as selected by the output of counter 355 from lines 407 through 409, goes low. While multivibrator 344 is producing its high pulse to line 404 it also produces a low pulse to line 390. This low pulse along with the low output from demultiplexer 358 causes one of the OR gates 392 through 399 to go low. This low output actuates the SCR driver associated therewith. During the next low to high transition of the digital pulse stream on line 66, the output of flip-flop 342 to line 329 goes low and its output to line 332 goes high. The low to high transition on line 332 causes multivibrator 353 to be actuated and to produce its high pulse on line 360 and its low pulse on line 362. The low to high transition also causes counter 355 to advance by one count. The high signal on line 332 disables demultiplexer 358 and all its outputs go high. The low output on line 329 and the high pulse on line 360 enables demultiplexer 350 and the output as selected by counter 347 through lines 375, 376 and 377 goes low. For example, if the count in counter 347 was 7, i.e., its outputs to lines 375 through 377 are high. The output of demultiplexer 352 line 387 goes low. The negative pulse on line 362 and the low signal on line 387 cause OR gate 372 to have its output go low. The low output of OR gate 372 in turn causes SCR driver 423 to produce a gating pulse which is applied to the gate of SCR 84 (FIG. 5) through line 91. OR gate has its output go high again when the output of multivibrator 353 to line 362 goes high. Thus, the SCR sequencer 22 as shown in FIG. 4 distributes one pulse of the digital pulse stream on line 66 to each of the 16 SCRs (only SCRs 84 through 87 are shown in FIG. 5) in a known sequence as determined by counter 347 and 355 and demultiplexers 350 and 358. Counters 347 and 355 count from 0 to 7 and recycle to 0 and continue to count.

The operation of the SCR sequencer 22 in connection with recovery detector 18 is discussed herebelow. Assuming that the Q output of flip-flop 342 is low and the count within counter 347 is at 6, the next low to high transition of the digital pulse stream on line 66 causes the Q output of flip-flop 342 to go high and the /Q output of flip-flop 342 to go low. The low to high transition on line 329 causes counter 347 to change its count from 6 to 7, i.e., the output to lines 375 through 377 is high. Demultiplexer 350 is also disabled by the high signal on line 329. The output of counter 347 to line 328 goes high. With the signal on lines 329 and 328 high, NAND gate 323 (FIG. 2) has its output go low if the reactor 70 has not recovered as indicated by the high output of flip-flop 320 as discussed above in connection with FIG. 2. The low output of NAND gate 323 is transferred through line 250 to an input of NAND gate 245 (FIG. 3) which in turn causes the output of flip-flop 253 to go low during the next low to high transition of the clock pulse produced by clock 235. This of course prevents any further low to high transitions on line 66 until the output of flip-flop 320 goes low indicating that the reactor 70 has ceased to transfer energy. The output of NAND gate 323 goes high when reactor 70 recovers, with high signals on line 251 and 247 which causes the output of NAND gate 245 (FIG. 3) to go low. This allows the maximum frequency detector 20 to continue to operate as discussed above.

As shown in FIG. 5, the control apparatus 10 produces a gating pulse on the lines (only lines 91 through 94 are shown in FIG. 5). To each of the SCRs within switching regulator circuit 12. For example, when SCR driver 423 produces its gating pulse, this is transferred through line 91 as an input to the gate of SCR 84. SCR 84 has a positive potential applied from its anode to cathode. When the gating pulse is applied to the gate of SCR 84 it ducts and current passes through primary winding 77 and reactor 70 and through capacitor 429 to terminal 43. Thus the current flow is from terminal 42 through SCR 84, primary winding 77, capacitor 429 to terminal 43.

A capacitor 430 is connected between terminal 42 and terminal 43. A capacitor 432 is connected at one end to the side of capacitor 429 away from terminal 43 and at its other side to terminal 42. One end of primary winding 78 is connected to capacitors 429 and 432 and its other opposite end is connected to the anode of SCR 85. The cathode of SCR 85 is connected through line 29 to terminal 43. The anode of SCR 86 is connected to terminal 42 and its cathode is connected to one end of primary winding 79. The other opposite end of primary winding 79 is connected to one side of capacitors 435 and 436, and one end of primary winding 80. The other opposite end of primary winding 80 is connected to the anode of SCR 87. The cathode of SCR 87 is connected to the side of capacitor 436 away from primary winding 79 and to one side of capacitor 438. The other side of capacitor 483 away from SCR 87 is connected to terminal 43. The side of capacitor 435 away from primary winding 79 is connected to terminal 42. As discussed above, lines 91 through 94 from control apparatus 10 are connected to the gates of SCRs 84 through 87, respectively.

Secondary windings 100 and 101 of reactor 70 are connected together at one end to line 442. The end of secondary winding 100 away from secondary winding 101 is connected to a winding 447 of transformer 12. The end of secondary winding 101 away from its connection with winding 100 is connected to a winding 450 of transformer 112. Windings 447 and 450 away from the secondary windings are connected to the anodes of diodes 455 and 456, respectively. The cathodes of diodes 455 and 456 are connected to line 458.

One side of secondary windings 102 through 107 are connected to line 442. The sides of secondary windings 102 through 107 away from line 442 are connected to the anodes of diodes 462 through 467, respectively. The cathode of diodes 462 through 467 are connected to line 458. A capacitor 470 is connected between lines 442 and 458. Line 458 is also connected to one side of winding 473 of a choke 475. The other end of winding 473 away from line 458 is connected through line 36 to output terminal 32. The other winding 477 of choke 475 is connected between line 46 and line 36. A capacitor 480 is connected between lines 36 and 37. Line 442 is connected to one end of a winding 483 of a choke 485. The other end of winding 483 away from line 442 is connected through line 37 to output terminal 33. The other winding 487 of choke 485 is connected between line 37 and line 47. This arrangement subtracts the phase shift from the output voltage on terminals 32 and 33.

When a gating pulse is provided by control apparatus 10 through line 91 to the gate of SCR 84, SCR 84 allows the current provided by power source 39 (FIG. 1) to flow from terminal 42 through SCR 84, primary winding 77 and capacitor 429 to terminal 43. When the SCR is switched off, the reactor recovery current flow causes a reverse potential to be developed across secondary windings 100 and 101. The potential difference causes a current flow through diodes 455 and 456 from output terminal 32 to output terminal 33 (through the load across the terminals). Thus, the energy is transferred from primary winding 77 to the secondary windings 100 and 101. This energy is utilized to maintain a certain predetermined voltage between the output terminals 32 and 33. The other reactors (only reactors 71 through 73 are shown) operate in approximately the same manner to provide the predetermined output voltage to terminals 32 and 33.

The current flow through secondary windings 100 and 101 and windings 447 and 450 of transformer 112 causes winding 452 to develop a potential which is provided to control apparatus 10. When diodes 455 and 456 cease to conduct, no potential is developed across secondary windings 100 and 101, the current flow will cease and zero potential will exist across winding 452.

The output voltage of the switching regulator circuit 12 is provided throught lines 46 and 47 to control apparatus 10. Information concerning the status of reactor 70 is provided through lines 50 and 51 to control apparatus 10 from winding 452 of transformer 112. One end of transformer 112 is connected to line 50 and the other opposite end is connected to line 51. Control apparatus 10 provides gating pulses to each of the SCRs (only SCRs 84 through 87 are shown in FIG. 5) through channel 56 (only lines 91 through 94 are shown in FIG. 5). The voltage provided through lines 46 and 47 is received by the control apparatus 10 and specifically is an input to the voltage controlled oscillator 25 (FIG. 1). The SCR sequencer 22 distributes a digital pulse of said digital pulse stream to each of the SCRs, for example, to SCR driver 423 (FIG. 4) from OR gate 372 to line 91.

As the frequency of the digital pulse stream on line 66 increases the interval between actuation of an SCR within the switching regulator circuit 12 decreases. This decrease in the time period interval between actuation of an SCR (only SCRs 84 through 87 are shown) the more energy which is supplied at output terminals 32 and 33 and therefor as the load requirements increase the current available as provided through lines 36 and 37 increases. If the load decreases and the voltage as measured from output terminal 32 to 33 increases control apparatus 10 senses the increase in voltage through lines 46 and 47 and the frequency of the digital pulse stream produced by voltage controlled oscillator 25 decreases to assure that the voltage between output terminal 32 and 33 remains equal to the predetermined voltage.

The maximum frequency detector 20 and the voltage controlled oscillator 25 are more fully described in U.S. patent applications Ser. Nos. 191,117 and 191,111 filed on Sept. 26, 1980 by Nowell and entitled "Maximum Frequency Detector" and "Voltage Controlled Oscillator", respectively.

In summary, a control apparatus 10 for a switching regulator circuit 12 is capable of producing a regulated DC output at output terminals 32 and 33. The control circuit 10 receives the output voltage present on terminals 32 and 33 through lines 46 and 47 to voltage controlled oscillator 25. Voltage controlled oscillator 25 responds to any deviation of the output voltage on terminals 32 and 33 from a certain predetermined voltage. The voltage controlled oscillator responds to the deviation by increasing the frequency of the digital pulse stream it produces if the output voltage deviates by decreasing. If the output voltage on terminals 32 and 33 increases over the predetermined voltage, voltage controlled oscillator 25 reduces the frequency of the digital pulse stream it produces in response thereto.

Recovery detector 18 utilizes inputs from two transformers (only transformer 112 in FIG. 5 is shown), associated with two of the reactor-SCR combinations to determine if the reactors have fully recovered from their prior actuation. If the particular reactor has not fully recovered the digital pulse which is to be distributed by SCR sequencer 22 to the SCR associated with that reactor is held until the recovery has taken place. Maximum frequency detector 20 receives the digital pulse stream and prevents the frequency of the digital pulse stream from exceeding a certain preselected maximum frequency. If the digital pulse stream attempts to exceed the certain preselected frequency, the maximum frequency detector will maintain the frequency of the digital pulse stream at the maximum frequency until the frequency of the digital pulse stream drops below the predetermined maximum frequency. Thereafter the maximum frequency detector provides as its output a digital pulse stream which has a frequency equal to the digital pulse stream it receives. The SCR sequencer 22 receives the output of the maximum frequency detector and distributes one digital pulse of the digital pulse stream to each of the SCRs within the switching regulator circuit 12. Each SCR is actuated by having a digital pulse distributed thereto by sequencer 22 in a known sequence prior to the next actuation of a particular SCR.

Whereas as the present invention has been described in particular relation to the drawings attached hereto, it should be understood that other and further modifications, apart from those shown or suggested herein, may be made within the spirit and scope of this invention.

What is claimed is:

1. A method of controlling a switching regulator circuit having a plurality of SCRs and reactors comprising the steps of:
    a. producing a continuous digital pulse stream,
    b. varying the frequency of said digital pulse stream within the approximate range of 0-400 KHz in response to deviation of the output voltage of said switching regulator circuit from a predetermined voltage;
    c. preventing said digital pulse stream from exceeding a certain maximum frequency; and
    d. distributing one pulse of said digital pulse stream to each SCR of said plurality of SCRs in a preselected sequence for firing said SCR to maintain the output voltage of said switching regulator circuit approximately equal to said predetermined voltage.

2. A switching control apparatus for a switching regulator circuit having a plurality of SCRs comprising;
    a. a voltage controlled oscillator capable of producing a digital pulse stream having an accurate frequency in the range of approximately 0-400 KHz in response to voltage deviation from a predetermined reference voltage of said switching regulator circuit;
    b. a crystal controlled oscillator producing a clock pulse of stable frequency much higher than 400 KHz;
    c. a maximum frequency detector receiving said digital pulse stream and said clock pulse for preventing the frequency of said digital pulse stream from exceeding a predetermined maximum frequency as determined from said clock pulse; and
    d. an SCR sequencer in electrical communication with each SCR and receiving said digital pulse stream for providing a pulse to each SCR in a known sequence for actuation thereof.

3. Apparatus as set forth in claim 2 wherein said switching regulator has said SCRs equally divided into a first and second group of SCRs, said SCR sequencer providing one pulse to said first group of SCRs and next pulse within said digital pulse stream following said one pulse to said second group of SCRs.

4. A digital control apparatus for a switching regulator circuit having a certain number of SCRs, comrising;

a. a voltage controlled oscillator producing a digital pulse stream having a frequency in the range of approximately 0–400 KHz and responsive to deviation of the output voltage of said switching regulator circuit from a predetermined voltage by altering the frequency of said digital stream;

b. a crystal controlled clock producing a stable clock pulse of known constant frequency;

c. a maximum frequency detector operatively connected to receive said digital pulse stream and said clock pulse for limiting said digital pulse stream to a predetermined maximum frequency as determined from said clock pulse; and d. an SCR sequencer receiving said digital stream for providing each SCR with one pulse from said digital stream in a known sequence, each SCR responding to said one pulse by actuating to produce said output voltage, each SCR receiving a first pulse and a second pulse located in said digital stream a certain number of pulses subsequent to said first pulse, said certain number of pulses equal to said certain number of SCRs.

5. Digital control apparatus as set forth in claim 4 wherein said predetermined maximum frequency is less than the minimum recovery period for a reactor associated with said SCR times said certain number of SCRs.

6. Digital control apparatus as set forth in claim 4 wherein said certain number of SCRs is an even integer.

7. Digital control apparatus as set forth in claim 6 wherein said SCRs are divided into a first and second group; said sequencer providing a certain pulse to one SCR in said first group and next pulse following said certain pulse in said digital stream to another SCR in said second group.

8. A control apparatus for a switching regulator circuit having a plurality of SCRs and producing a regulated output voltage, each SCR being actuated by a gating pulse applied to the gate thereto to produce said output voltage at an output of said switching regulator circuit, comprising;

a. a voltage controlled oscillator connected to receive said output voltage and producing a digital pulse stream having a frequency in the range of approximately 0–400 KHz in response to a deviation of said output voltage from a predetermined voltage by increasing the frequency of said digital stream when said output voltage is less than said predetermined voltage and by decreasing the frequency of said digital pulse stream when said output voltage is greater than said predetermined voltage;

b. a maximum frequency detector operatively connected to receive said digital stream for preventing the frequency of said digital stream from exceeding a predetermined maximum frequency; and c. an SCR sequencer receiving said digital stream for distributing a pulse of said digital stream to each of said SCRs in a known sequence, a first gating pulse of said digital stream being provided to a first SCR and gating pulses subsequent to said first gating pulse being provided to other SCRs except said first SCR with a second gating pulse being provided to said first SCR thereafter.

9. A control apparatus as set forth in claim 8 wherein said switching regulator circuit includes at least one reactor, said reactor having a primary winding and two secondary windings, said primary winding being connected to a power source through one SCR, each of said secondary windings being connected to said output of said switching regulator circuit through a diode, at least one secondary winding being connected to said output through a transformer; and including a recovery detector connected to said transformer for determining if said one reactor has recovered from conducting to prevent actuation of said one SCR.

10. A digital control apparatus for a switching regulator circuit having a plurality of reactors and a plurality of SCRs, each SCR having a gate, an anode, and a cathode, said SCR responding to a gating pulse applied to said gate thereof by conducting current from a power source through said anode and cathode, each SCR connected to one end of the primary winding of a reactor of said reactors with the other opposite end of the primary winding connected to said power source, each secondary winding of said reactors being connected to the output of said switching regulator circuit to produce an output voltage, comprising;

a. a frequency means for producing a digital pulse stream having a frequency in the range of 0–400 KHz in response to deviation of said output voltage from a predetermined reference voltage;

b. a maximum frequency means receiving said digital stream for preventing the frequency thereof from exceeding a predetermined maximum frequency; and c. a pulse distribution means receiving said digital pulse stream for providing one pulse of said digital stream to each of said SCRs in a known sequence for actuation thereof.

11. A control apparatus for a switching regulator circuit having a certain number of SCRs comprising:

a. a voltage controlled oscillator producing a digital pulse stream having an accurate frequency in the range of 0–400 KHz in response to deviation of the output voltage of said switching regulator circuit from a certain predetermined DC voltage, said voltage controlled oscillator including a comparator operatively connected to receive the output voltage of said switching regulator circuit and said predetermined voltage for producing a signal in response to difference between the output voltage of said switching regulator circuit and said predetermined voltage, and a pulse width modulator connected to receive said signal to produce said digital pulse stream in response to said signal;

b. a crystal controlled oscillator producing a clock pulse of a certain frequency;

c. a maximum frequency detector operatively connected to receive said clock pulse and said digital pulse stream for preventing said digital pulse stream from exceeding a preselected maximum frequency as determined from said clock pulse; and d. an SCR sequencer receiving said digital pulse stream for distributing one pulse of a certain number of consecutive pulses within said digital pulse stream to one of said SCRs in a known sequence to actuate said SCR for maintaining the output voltage of said switching regulator circuit, said certain number of pulses equals said certain number of SCRs.

12. Control apparatus for a switching regulator circuit having a plurality of SCRs to produce an output voltage thereof, each SCR responding to a gating pulse applied to its gate for actuation thereof by conducting current from a power source through an anode and a cathode which are connected to form a diode within said SCR, comprising:

a. an operational amplifier connected to receive the output voltage of said switching regulator circuit;
b. a comparator connected to receive the output voltage of said switching regulator circuit and said reference voltage for producing a signal to actuate said operational amplifier;
c. a pulse width modulator in communication with said operational amplifier and producing a digital pulse stream with a frequency varying over the range of 0–400 KHz in response to the output of said operational amplifier;
d. a maximum frequency detector receiving said digital pulse stream for preventing the frequency of said stream from exceeding a predetermined maximum frequency;
e. recovery detector connected to at least one SCR determining if a reactor associated with said one SCR has recovered from its prior actuation and receiving said digital pulse stream to prevent said SCR being actuated prior to recovery from the prior actuation of said reactor; and
f. a SCR sequencer receiving said digital pulse stream and connected to said SCRs for distributing one pulse to each of said SCRs in a known sequence to produce a gating pulse.

* * * * *